United States Patent [19]

Ogawa et al.

[11] Patent Number: 5,460,873
[45] Date of Patent: Oct. 24, 1995

[54] COVER FABRIC WITH LATEX FOAM BACKING AND INTEGRALLY FOAMED ARTICLE USING THE SAME

[76] Inventors: Taro Ogawa, 8-52, Kojima Ajinokami 1-chome, Kurashiki-City, Okayama Prefecuture 711; Fumio Goto, 829-4, Kushida, Kurashiki-City Okayama Prefecuture 710-01; Yasuo Tanaka, Hanajiri 29, Okayama-City Okayama Prefecuture 701-01, all of Japan; Christian Thary, 36640 Howard Rd., Farmington Hills, Mich. 48331

[21] Appl. No.: 50,152
[22] PCT Filed: Aug. 27, 1991
[86] PCT No.: PCT/JP91/01135
 § 371 Date: May 17, 1993
 § 102(e) Date: May 17, 1993
[51] Int. Cl.⁶ ..................... B32B 5/24
[52] U.S. Cl. ............ 428/316.6; 296/97.1; 296/97.9; 297/452.61; 297/DIG. 1; 427/369; 427/370; 427/412; 428/71; 428/322.7; 428/339
[58] Field of Search ............. 428/316.6, 322.7, 428/71, 310.5, 218, 339; 264/41, 51; 156/78; 427/412, 369, 370; 296/97.9, 97.1; 297/452.61, DIG. 1

[56] References Cited

U.S. PATENT DOCUMENTS

| | | | |
|---|---|---|---|
| 2,795,207 | 6/1957 | Marco | 118/44 |
| 3,713,868 | 1/1973 | Gordon et al. | 117/65.2 |
| 4,353,955 | 10/1982 | Cook | 428/246 |
| 4,502,234 | 3/1985 | Schaefer et al. | 36/28 |
| 4,544,598 | 10/1985 | Meiller et al. | 428/246 |
| 5,034,266 | 7/1991 | Kinlaw et al. | 428/254 |

FOREIGN PATENT DOCUMENTS

| | | |
|---|---|---|
| 2407835 | 1/1979 | France . |
| 2628355 | 3/1988 | France . |
| 3230321 | 2/1984 | Germany . |
| 3612834 | 10/1987 | Germany . |
| 3614481 | 11/1987 | Germany . |
| 702335 | 1/1954 | United Kingdom . |
| 2135675 | 9/1984 | United Kingdom . |
| WO92/10119 | 6/1992 | WIPO . |

Primary Examiner—Paul J. Thibodeau
Assistant Examiner—David Abraham
Attorney, Agent, or Firm—Renner, Kenner, Greive, Bobak, Taylor & Weber

[57] ABSTRACT

A composite cover material to be used for making an integrally foamed article comprises a permeable fabric (10) and a thin layer of latex foam (15) strongly bonded via bonding zone (17) to said fabric. The latex foam layer (15) is made by applying high molecular latex material such as rubbers or synthetic resins as coating to back surface (12) of said fabric, and permitting said latex material to foam and cure. The latex foam has relatively fine mechanical open cells (18) in its internal part and further finer open cells (20) near its outer surface skin (22) which is permeable by virtue of minute holes (21) formed therein. The skin (22), though permeable by minutes holes, can serve as substantially flat and smooth barrier surface against liquid foamable mixtures poured directly onto said skin for making body foam (25) so as to guide slidingly said mixtures therealong and also prevent substantial impregnation into said latex foam.

16 Claims, 4 Drawing Sheets

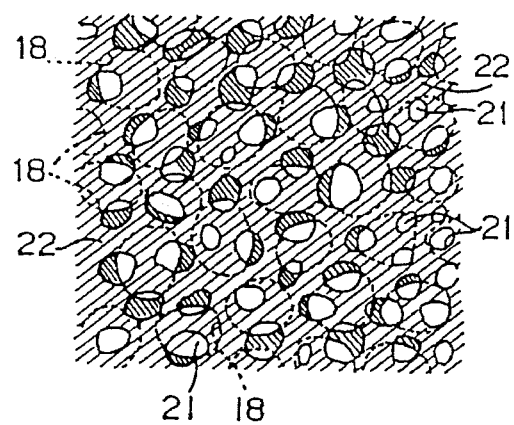
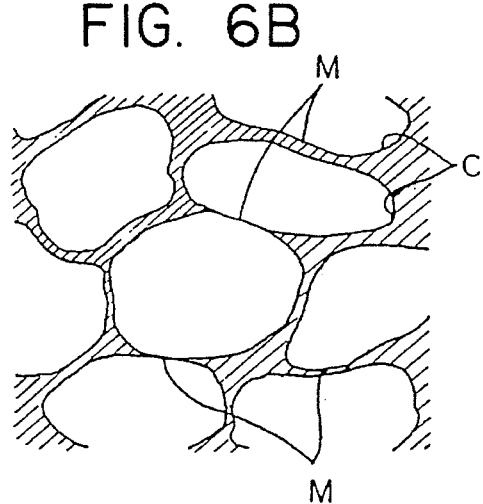
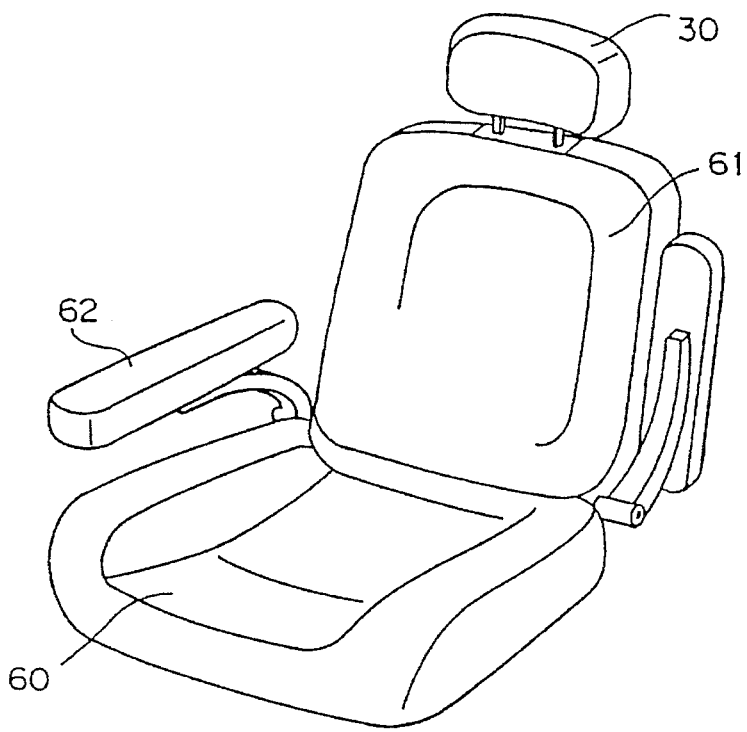

COVER FABRIC WITH LATEX FOAM BACKING AND INTEGRALLY FOAMED ARTICLE USING THE SAME

TECHNICAL FIELD

This invention relates to a cover fabric with back-coated thin layer of latex foam, and to a foamed article integrally molded with the said fabric. More particularly, the invention relates to a composite cover material comprising a permeable fabric having a thin permeable layer of foamed latex adhered to its back or inner surface, and to a foamed article such as vehicle seats, seat cushions, headrests, armrests, sun visors and the like, all produced by utilizing the composite fabric of the invention in the integral molding technique.

BACKGROUND ART

It has long been well known to produce a soft foam article having a cover integrally adhered thereto by providing a permeable cover fabric in the shape of desired final article and pouring into the shaped cover fabric a soft polyurethane stock material to form a body foam which is integrally adhered with the cover fabric. However, if the liquid stock material is injected directly onto the inside surface of the permeable fabric, the material easily permeates into or even through the texture of the fabric so as to form disadvantageously partially stiffened areas uncomfortable in touch and called, e.g., hard spots or hard layers in the fabric. To avoid these disadvantages, it is proposed in the art to provide a buffer layer to prevent the stock solution from penetrating the cover fabric.

According to this proposal, it is alleged that a thin urethane foam (called "slab foam" or "slab urethane") is adhered as a buffer layer to the inside surface of the cover fabric. Polyurethane stock solution may be directly poured onto this urethane foam and penetrates only slightly into the urethane foam thereby to produce a thin "superficial" layer which provides sufficient bonding strength between polyurethane body foam and the cover fabric to which the slab urethane is adhered.

However, many disadvantages are found in that creamy polyurethane stock poured directly onto the slab urethane buffer layer tends to easily penetrate relatively large cells of the buffer layer or pass through the buffer layer to reach the cover fabric to adversely form thereat hard spots, or the poured stock material permeates the buffer layer over the wide range thereof to produce undesirable thick stiffened or impregnated layers.

On the other hand, for the purpose of avoiding penetration or impregnation of the body foam into the cover fabric, techniques to apply an airtight film on the inside surface of the cover fabric are proposed in various United States Patents. For example, U.S. Pat. Nos. 4,247,347 to Lischer et al., Jan. 27, 1981, 4,247,348 to Lischer, Jan. 27, 1981, 4,264,386 to Sears, Jr. et al., Apr. 28, 1981, and 4,287,143 to Sears, Jr. et al., Sep. 1, 1981 disclose applying of airtight films, preferably polyvinylchloride film, to the back surface of the cover fabric. Such airtight or impermeable films, however, deprive the finished foamed article of the permeability and leads to an uncomfortable feeling, such as a moist or sticky touch on the surface of the article.

If the use of thin urethane foam (called slab urethane) above-mentioned and the use of impermeable films taught by various U.S. Patents are combined, no particular effects can be expected to attain comfortable feelings on the surface of the article resulting from the permeability of the cover fabric. To attain the desired comfort, there must be an intermediate layer, which is permeable in nature, between the cover fabric and the body foam that also contributes to prevention of substantial penetration or impregnation of the body foam into the intermediate layer itself.

Furthermore, use of the slab urethane as a buffer layer in the prior art is not found to be a favorable technique in that it involves time-consuming manufacturing processes such as producing first a large mass of foamed urethane and then slicing the mass into a plurality of slabs which are difficult to handle and require large space for storing them before using the same. Further, sliced slab urethane should be applied to the cover fabric by using the flame welding technique which inevitably produces a large amount of poisonous gases imparting adverse influences to workmen in the factory and also the environment thereof. In addition, if, on the basis of teachings of the aforementioned U.S. Patents, an improved method be devised wherein non-airtight, porous films can be applied to the inner surface of the aforementioned slab urethane buffer of the prior art to produce a favorably permeable foamed article, such as seat cushions, such a method cannot solve essential problems so long as it involves a cumbersome and expensive processes for preparing slab urethane foams and applying the same onto the back surface of the fabric. Further, such a method releases a large amount of poisonous gases during bonding of the film onto the buffer layer and the buffer layer onto the fabric.

DISCLOSURE OF INVENTION

Accordingly, it is an object of the present invention to provide a novel cover material for use in integrally molded foam articles which is able to be manufactured through simple procedures without producing poisonous gases and other environmental pollution and which has a desirable permeability as well as a good ability to prevent penetration or impregnation of the body foam otherwise causing formation of hard spots or other incongruities in the final article.

It is another object of the invention to provide a method for manufacturing the above-mentioned cover material in a practical manner.

It is yet another object of the invention to provide an integrally foamed article itself prepared by using the above-mentioned novel cover material.

These and other objects of the present invention can be accomplished by providing a novel cover material comprising a permeable fabric and a thin layer of latex foam integrally applied to the back surface of the fabric, the latex foam being prepared by applying one or more latices of high molecular materials including rubbers and synthetic resins to the permeable fabric as a back-coating and permitting the same to foam and cure thereby to cause numerous fine open cells to be formed in the internal part of latex foam layer and also finer or denser open cells to be formed in the region adjacent to the outer surface of the latex foam layer. On the outer surface of latex foam is also formed a superficial skin which is permeable or breathable in nature and yet acts as a barrier against a stock material for making a body foam of an article.

The thickness of latex foam layer can be controlled by varying the amount of a latex material applied to the fabric and preferably latex material may be caused to foam and cure such that the final layer of latex foam becomes usually from 0.1 to 3.0 mm (millimeters) thick. Open cells formed in the thin latex foam layer are mechanical open cells which can be relatively easily controlled in the number of cells by adjustably conducting mechanical stirring of latex material before applying it to the fabric. Adjusting is possible by thorough stirring to increase the number of cells and to reduce the density of the thin latex foam layer so as to increase permeability of the layer. In this respect, it is not easy to directly control the sizes of open cells, but it is possible to increase the thickness of a finer or denser cell layer. In general, denser cells have sizes ranging from $2\mu$ (microns) to $10\mu$, whereas internal open cells range from $10\mu$ to $30\mu$. The number of cells can be varied on the average preferably from 20,000 cells per $cm^2$ to 70,000 cells per $cm^2$. This adjusting can be easily carried out in the place where the cover materials are manufactured utilizing latex foam layers of the invention in contrast to the prior art slab urethane foam which is supplied as a finished product from another place. Further, the latex foam layer employed in the present invention has a distinct advantage in that the sizes of open cells in the latex foam layer are one fifth to one tenth as small as those of prior art slab urethane, and even from one tenth to one eightieth in the superficial skin.

As a fabric composing the cover material of the invention, knitted, woven or non-woven fabrics of natural fibers such as cotton and woolen yarns, a variety of synthetic fibers and mixtures thereof may be used. The fabric should be permeable, hygroscopic and of comfortable touch. Prior to coating with latex material, the fabric should be cleaned to remove any wrinkles, creases, dust, etc., and conditioned for flatness.

Latices used in the present invention include rubber latices such as various natural and synthetic rubbers, e.g., styrene butadiene rubber, acrylonitrile butadiene rubber, natural rubber, silicone rubber, methylene butadiene rubber and the like, modified forms and copolymers thereof; and resinous latices such as various synthetic resins, e.g., acrylic, urethane, vinyl chloride, vinyl acetate, polyvinyl alcohol, polystyrene, polyethylene, and modified forms, alloy and copolymers thereof.

Appropriate material selected from the above-mentioned candidate latices is first subjected to a mechanical stirring operation while held at an adequate temperature in the range of about 20°–40 ° C. so as to be ready for producing mechanical cells when applied to the fabric. The less stirring is done, the less number of cells will be produced with less permeability. It is important in the present invention that sufficient stirring is done to cause air to be taken into the latex mass in sufficient quantity so as to provide a latex foam having lower density and, therefore, a greater number of cells. Stirring should be done at a temperature in the range above noted for a period of from 3 to 5 minutes depending upon the particular latex material selected.

Subsquent to stirring, the latex material is applied to the back surface of the particular fabric at a temperature also in the range of about 20°–40 ° C. by means of knife-coating or roll-coating techniques. If latex is applied at temperatures that are too low, large air bubbles may be caught up in the latex mass and uniform thickness of the latex coating will not be attained. On the other hand, temperatures that are too high are also inadequate in that air bubbles are allowed to easily escape out of the latex mass and a highly bulky coating is not easy to attain.

Latex material, upon being applied in a predetermined thickness, is subjected to a preliminary drying step and a curing step. Whereas these steps may be conducted in various ways dependent upon the desired thickness of coating and density sought for the latex foam, it is preferable in the standard procedure that preliminary drying be done at a temperature ranging from 80° to 120 ° C. for a period of 3–5 minutes and subsequent curing be at a temperature of from 150°–170 ° C. for a period of 2–3 minutes. If preliminary drying is done at temperatures that are too high and for too short a time period, the resultant latex foam will be found unsatisfactory because of a thick skin, a thin denser layer, and large internal open cells as well as large holes in the skin, which together lead to undesired impregnation of the body foam into the latex foam. In contrast, if latex material upon being applied to the fabric is allowed to stand for too long a time period, for instance, overnight, latex foam with a thin skin, denser or smaller cells in the major part, few large cells and minute holes in the skin will result so that impregnation of the body foam into the latex is effectively prevented, at the sacrifice of permeability, however.

To obtain adequate permeability and as many dense cells as possible in the latex foam, it is preferable to conduct a crushing operation subsequently to the preliminary drying step. That is, latex material is sufficiently stirred so as to produce a latex foam of as low a density as possible (the greater number of cells), applied to the back surface of the fabric and dried preliminarily, and then, the entire fabric is subjected to a crushing operation in which the larger cells of the latex foam are crushed and conveniently reduced to smaller cells suitable to retain permeability of the latex foam. Depending upon the extent of crushing operation carried out, permeability of the latex foam can be controlled to a certain extent. Thus, crushing is an advantageous means to obtain a desirable latex foam of the invention having light weight, many denser cells, good permeability and the ability to prevent impregnation by the body foam. Usually, crushing is carried out either by machinery or by manual labor, but preferably, as the simplest way, the fabric with the latex foam applied thereto may be passed between a pair of crushing rolls which are freely adjustable in regard to the distance therebetween.

The composite cover material of the present invention thus prepared comprises the thin latex foam layer having on its outer surface a substantially flat and smooth skin and in its internal part mechanical open cells susceptible to be controlled as to its formation. Thus, the cover material of the invention can retain as good a permeability as desired and a superior ability to prevent deep penetration or impregnation thereinto by the body foam so that no noticeably stiffened impregnated layer is formed in the backing unlike the prior art cover fabric with urethane backing. Moreover, the latex foam layer of the invention provides strong mechanial bonding to the body foam due to its denser cell layer and skin with minute holes. Therefore, the cover material of the present invention is most adequate to be used for making an integrally molded article having comfortable and soft touch and high degree of permeability. Among various integrally foamed articles for which the cover material of the invention is applicable, vehicle seats, seat cushions, headrests and armrests are practically producible, and in particular thin and elongate products such as sun visors can also advantageously be fabricated with high quality and at low cost by the cover material of the invention.

The cover material of the invention can be manufactured in a simpler, safer and more inexpensive process than the prior art cover material with urethane backing. Latices used in the invention are water soluble sol (coloidal solutions) which, upon being applied to the fabric, are securely fixed to the fabric fibers such that latex materials upon cure embrace individual fibers of the fabric to make mechanical bondings between the latex foam and fibers, so that bonding strength between the fabric and the latex foam backing is hardly influenced by different type, composition, texture and so on of the fabrics employed. On the contrary, the prior art cover materials with slab urethane are very likely to have varied bonding strengths with different fabric surfaces due to uneven surface conditions to which slab urethane is to be adhered or bonded. By the present invention, an unlimited number of kinds of fabrics can be employed for manufacturing the composite cover material so that a great degree of flexibility in designing the integrally foamed article is ensured. Due to more uniform bonding strength than that of adhesives or welding, the invention assures production of an integrally foamed article having a stable nature and high quality.

Further, the method for manufacturing the cover material of the invention is recommendable from the viewpoint of environmental hygienics because the latices employed in the invention are water soluble sol solution and they do not produce in any sense poisonous and polluting gases which would be produced by flame welding process of the prior art slab urethane backing.

Additionally, in the process for making the integrally molded article, foamable mixture is generally over-packed into the shaped cover material in greater amounts than theoretically calculated for the purpose of obtaining a desired shape as prescribed by the designer. In this respect, the prior art slab urethane back-coated fabric cannot get rid of defects in that the foamable mixture penetrates more deeply into the slab urethane foam under higher pressure of over-packing. In contrast to this, the cover material of the invention having latex foam backing can allow over-packing of about 5–8% higher than the calculated level with only slight, unnoticeable penetration occurring due to the superficial skin and denser cells of the latex foam, thus permitting both good shaping and the attainment of comfortable feeling of the final article to co-exist.

BRIEF DESCRIPTION OF DRAWINGS

FIG. 6 represents comparative views of a thin layer of latex foam of the invention (A) and a conventional slab urethane (B) shown schematically in microscopically enlarged scale.

FIG. 7 illustrates another example of an integrally foamed article using the cover material of the invention.

PREFERRED EMBODIMENT FOR CARRYING OUT THE INVENTION

Figure 1:
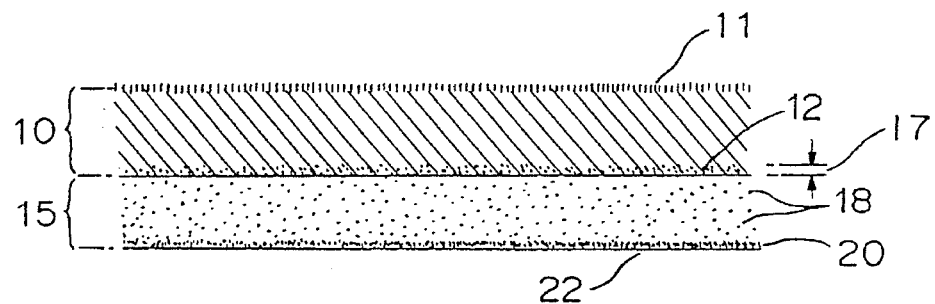
FIG. 1 is a partial schematic sectional view of a cover material according to the invention showing integrally bonding fabric and back-coated latex foam and a surface skin of the latex foam.

Referring now to the drawings, in particular FIG. 1, a cover material according to the invention is illustrated as comprising a permeable or breathable fabric 10 and a thin layer of latex foam 15 back-coated to the inner surface of fabric 10. As previously mentioned, the fabric 10 may be selected from knitted, woven and non-woven fabrics made of natural fibers such as cotton and wool, a variety of synthetic fibers and mixtures thereof, which are highly permeable, hygroscopic and of comfortable touch. Preferably, knitted fabrics of polyester fibers are usually employed. Fabric 10 has an outer surface 11 and an inner surface 12 with which a thin latex foam layer 15 according to the invention is interconnected through a bonding zone 17 as more fully discussed hereinafter.

Thin latex foam layer 15 is formed by directly applying an appropriate foaming material, selected from a wide variety of candidate materials, and permitting the material to foam and cure in situ. Latex foam layer 15 has in its internal part innumerable mechanically open cells 18 which ar relatively large in size and communicate with each other. On the side opposite to the fabric 10, latex foam layer 15 has a layer 20 of relatively denser open cells which are formed concurrently with the larger open cells 18 and an extremely thin surface skin 22 on the outside surface of denser cell layer 20.

As seen in FIG. 1, surface skin 22 has numerous minute holes 21 which render the skin 22 permeable or breathable yet present a substantially flat and smooth barrier surface to permit liquid stock poured thereon for forming a body foam 25 to be guided therealong smoothly and extensively without substantial penetration into minute holes 21. In this respect, latex foam layer 15 of the invention differs essentially from the convential slab urethane foam as fully explained later in connection with the two examples shown in FIG. 6 (A) and (B). It is preferable that latex foam layer 15 of the invention has a thickness ranging from 0.1 to 3.0 mm (millimeters), and most preferably from 0.8 to 2.0 mm.

Figure 2:
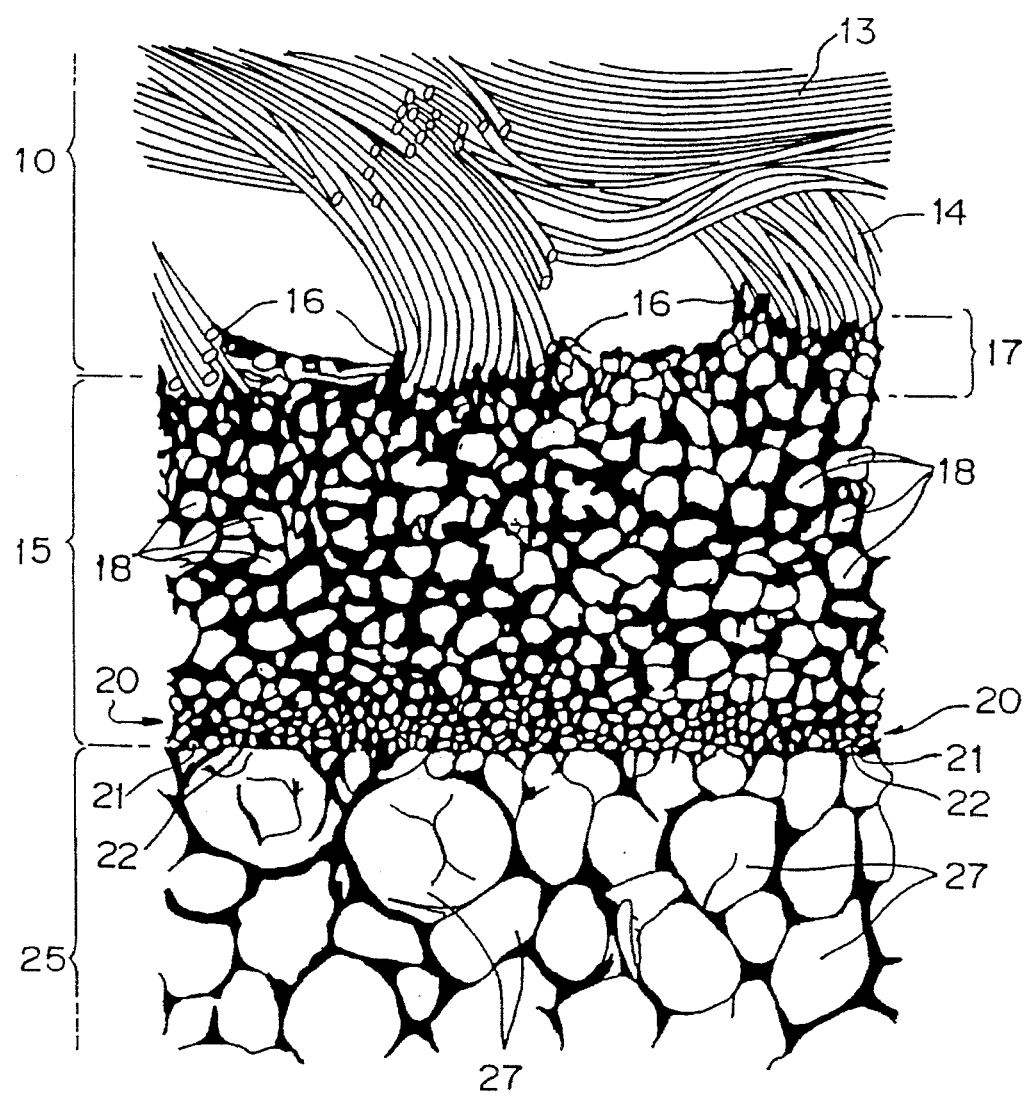
FIG. 2 represents a microscopically enlarged sectional view of a cover material according to the invention and a body foam integrally adhered thereto, wherein a portion of the latex foam adhering to some fibers of the fabric, a thin layer of latex foam having internal mechanically open cells and a surface skin, and a body foam strongly bonded to the surface skin can be clearly seen.

FIG. 2 shown schematically and in microscopically enlarged scale a cross sectional view of a foamed article made by directly pouring stock solution for the body foam 25, for example, high reaction type polyurethane mixtures onto the inside surface, i.e., surface skin 22, of the cover material. In FIG. 2, the fabric 10 is shown only for its inner portion adjacent to the inner surface 12 shown in FIG. 1, with some woofs 13 and warps 14 appearing in a fragmental fashion. Latex foam layer 15 in the region adjacent to fabric 10 more likely than not embraces fabric fibers, warps 14 in this instance, to make mechanical bondings 16 with fibers, which constitute as a whole a strong bonding zone 17 to ensure a very strong connection of fabric 10 and latex foam layer 15. Unlike the flame welding used to bond together the conventional slab urethane and the fabric, no poisonous gases occur during the bonding process of the latex foam to the fabric according to the invention, which can be carried out safely and silently with relatively simple and easy operations without any fear of environmental pollution.

Thin latex foam layer 15, upon being cured and dried, has numerous mechanically open cells 18, as clearly shown in FIG. 2, which communicate with each other and from end to end to ensure good permeability through the entire mass of latex foam 15. Adjacent to the undersurface of latex foam 15, a relatively denser layer of smaller open cells 20 is advantageously produced during its foaming process, and on the outermost part of denser layer 20 is formed the superficial skin 22 which is also permeable by virtue of minute holes 21. The superficial skin 22 is, irrespective of minute holes 21, a subtantially flat and smooth barrier surface against penetration of foaming stock for body foam 25 poured directly thereon. Thus, according to the invention, foamable mixtures such as high reaction type polyurethane, even where impinging directly upon superficial skin 22, do not penetrate substantially the latex foam 15 nor form any noticeable stiffened layer in the latex foam. This is in clear distinction from the conventional slab urethane foam which would produce a rather thick hardened layer within itself by directly contacting an injected liquid foamable material.

In the present invention, foamable mixtures contacting with superficial skin 22 in a not yet cured state cannot easily enter the latex foam 15 because the minute holes 21 resist their attempts to pass therethrough in substantial volumes. In a little while foamable mixtures undergo rapid foaming and curing reactions within minute holes 21 or at most only slightly over the minute holes where the mixture becomes a completely cured composition and stops its progress toward the inside of latex foam 15, so that so called stiffened layer, if formed, is as thin as the denser cell layer 20 and is not substantially noticeably sensed from the outside of the fabric. Though very thin, however, this stiffened layer formed within denser cell layer 20 well serves as the necessary interconnection between the body foam 25 and latex foam 15 and, hence, denser cell layer 20 with its superficial skin 22 functions as a barrier against substantial penetration of the body foam into the latex foam. Thus, the composite cover material of the invention has distinct features which would never be expected heretofore in that it has the mechanical bonding zone 17 serving to form a strong connection of the fabric 10 and the latex foam 15 and also has on the opposite side permeable skin 22 and a controllably formed denser layer 20 serving together to restrict substantial penetration of the body foam and yet permit formation of a strong interconnection with the body foam. Moreover, the superficial skin 22, though having minute holes 21, presents a substantially flat surface to smoothly and slidingly guide the foamable mixture for the body foam 25 over as extensive and as wide areas as possible.

Figure 3:
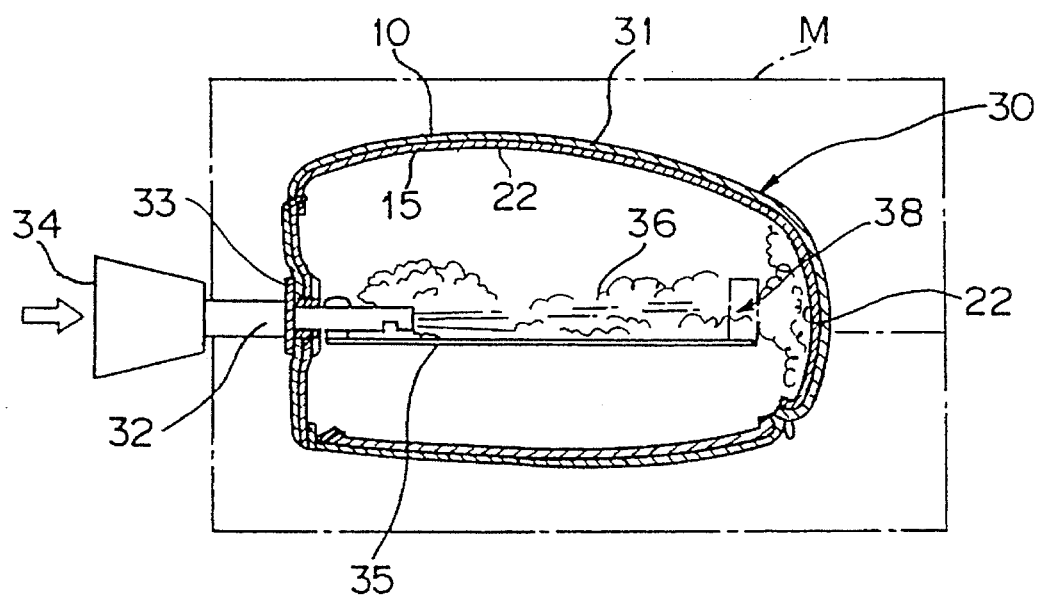
FIG. 3 illustrates one of the manufacturing steps according to the invention, wherein a headrest as an exemplary foamed article of the invention is manufactured by injecting a high reaction type of foaming stock material into a cover material of the invention which has been preliminarily shaped within a mold.

An exemplary foamed article which can be advantageously prepared by using the composite cover material is illustrated in FIG. 3 in which a headrest 30 to be mounted on the top of a seat back 61 (see FIG. 7) is being molded in a mold M. A composite cover material 31 according to the invention has been precontoured into any desired configuration of the headrest with fabric 10 facing outward and latex 15 foam facing inward to form a hollow box-like shape through sewing or welding treatment. Permeable skin 22 of latex foam 15 covers the entire inner surface of the headrest. The hollow box-like headrest has a fixture 33 attached to its bottom, through which an injection nozzle 32 is inserted into the inside of the hollow headrest, and then assembled nozzle and headrest cover 30 is set in an appropriate mold M shown in phantom lines in FIG. 3. An outer end of the nozzle 32 may be connected to a source (not shown) for supplying foamable mixtures for the body foam. A headrest core member 35 which is of metal or plastic is detachably supported on the inner end of the nozzle 32. In operation, a foamable liquid mixture 36 is injected through the nozzle 32 onto the core 35 and rapidly expands and foams in creamy state while it flows to a top side (right side in FIG. 3) of the headrest where it impinges against the skin 22.

In the prior art system utilizing the cover material with slab urethane back-coating, creamy foaming materials which impinge upon the slab urethane in yet cured state would penetrate easily and relatively deeply into the slab urethane to form disadvantageously stiffened zone therein, so that a relief measure such as a small block 38 shown in phantom lines in FIG. 3 should be disposed on the free end of the core 35 to disperse creamy foaming material therearound. In contrast, latex foam layer 15 with denser layer 20 and skin 22, though permeable through very minute holes 21, does not permit substantial penetration thereinto of the foaming mixture which, impinging upon the skin 22 in the top side of the headrest, will soon undergo and terminate its curing reaction and only minute portions of foaming mixture can enter the minute holes 21, as previously described in connection with FIG. 2. Another portion of foaming mixture injected on the core 35 and dispersed in all directions in creamy state also reaches other parts of the skin 22 of the entire inner surface of the headrest in the same fashion as immediately above-mentioned and substantially terminate their curing reactions thereat with only minute portions of the mixture penetrating the skin or at most the denser layer. Thus, by utilizing the composite cover material of the invention, it is possible to pour or inject foamable mixture directly into the shaped cover material to obtain a foamed article of high quality without fear of adverse penetration or impregnation of foaming mixtures into the fabric.

Figure 4A:
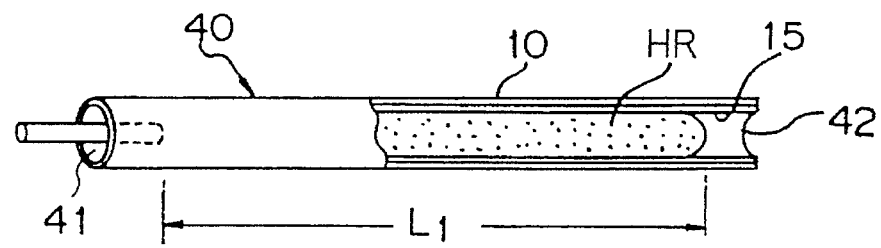
FIG. 4 shows two elongate foamed articles, utilizing a cover material with back-coated latex foam of the invention in (A) and a conventional cover material with "slab urethane" bonded thereto in (B), respectively, for comparison of the distances of $L_1$ and $L_2$ reached by foaming materials poured into the respective cover materials.

The cover material 10 of the invention has, as mentioned before, an advantage in that it can slidingly and smoothly guide foaming mixture injected thereon extensively over the wide and long range. This advantage can be depended upon particularly where relatively thin and elongate foamed articles are to be manufactured. FIG. 4 illustrates this advantage in comparative tests.

FIG. 4 (A) shows a tube 40 made of the cover material of the present invention comprising permeable fabric 10 and latex foam 15 back-coated thereto as already discussed in connection with FIGS. 1 and 2. Tube 40 is prepared by sewing a rectangular cover material into a tubular shape having an inner diameter of about 40 mm and a length of about 500 mm. Through an opening 41 at one end of the tube 40 was inserted a spout of a mixing head (not shown), as indicated in broken lines, and a high reaction type urethane mixture HR was injected through the spout. (Formulations of the mixture HR is seen in TABLE 1 below.)

Figure 4B:
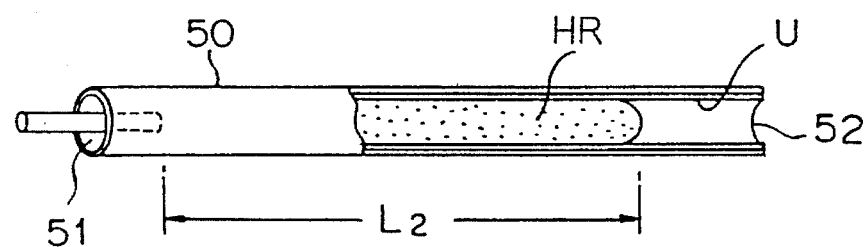

FIG. 4(B) shows a similar tube 50, but made of the prior art cover material with back-coated slab urethane foam U, and through an opening 51 thereof is inserted the same spout through which the same mixture HR as in (A) is injected. Injection for both tubes was made almost instantaneously (in a fraction of one second) to supply a predetermined amount of mixtures (see TABLE 1 below). Foaming mixtures HR thus injected flow along the inner surface (15 or U) of the tubes 40 and 50, toward the outer end 42 and 52, respectively while expanding and foaming and stopping their motion upon cure. The distance reached by the respective leading end of the foamed mixture HR is indicated by $L_1$ (the present invention) and $L_2$ (prior art), respectively. Apparently, the tube made of the cover material with latex foam backing 15 of the invention permits the injected mixture to attain a longer distance than the tube employing the prior art slab urethane backing U due to the difference in penetration or impregnation of foaming mixtures into the respective backings.

The results of five (5) tests obtained in a similar manner to FIG. 4 (A) and (B) are depicted in TABLE 1 below.

near the injection point and 13 at terminal point (363 mm), thus linearly decreasing hardness, whereas with the latex backing L hardness is noted to be substantially uniform, i.e.,

TABLE 1

| RUNS | Tube ID (mm) | Inject Time (sec) | Inject Amount (g) | Distance attained (mm) | Volume of Foam | | % Distance attained | Apparent Density (g/cm³) | Hardness Ascar C-type | | | Tube structure |
|---|---|---|---|---|---|---|---|---|---|---|---|---|
| | | | | | theory (liter) | Found (liter) | | | near nozzle | middle point | near end | |
| Run 1 | 41 | 0.24 | 35 | 355 | .66 | .469 | 71 | .0746 | 21–24 | 15–18 | 12–14 | end closed |
| Run 2 | 43 | 0.26 | 39 | 370 | .726 | .537 | 74 | .0726 | 11–15 | 12–15 | 12–14 | " |
| Run 3 | 40 | 0.25 | 39 | 363 | .63 | .457 | 73 | .0853 | 17–18 | 14–16 | 11–14 | " |
| Run 4 | 44 | 0.3 | 48 | 402 | .76 | .611 | 80 | .0786 | 10–14 | 8–11 | 8–12 | " |
| Run 5 | 43 | 0.29 | 43 | 356 | .726 | .517 | 71 | .0832 | 15–18 | 12–14 | 10–14 | " |

N.B. (1) Runs 1, 3 and 5 were conducted on the cover material with slab urethane backing of the prior art. Runs 2 and 4 were on the cover material with latex foam backing of the invention. All cover material was sewn up into tube of 48–49 mm outer diameter. High reaction urethane mixture for body foam was injected into each tube under no pressure charge.
(2) Each "Inject Amount" (injected amount) was calculated so that urethane to be injected could reach 500 mm point from nozzle end on the assumption that no impregnation of urethane into backing would occur.

As noted from TABLE 1, Run 2 (tube made of the cover material of the invention with one end closed) has attained the lowest density (apparent density). With different tube structure (both ends closed) in Runs 3 to 5, cover material of the invention (Run 4) again exhibits lower density than the prior art.

Also it is noted from TABLE 1 that the cover material using latex foam backing of the invention has achieved better results than the prior art in many respects, such as actual volumes attained by the body foam ("Volume of Foam" found), distance actually attained by the body foam, and % Distance attained (ratio of distance actually attained by the body foam to theoretical distance 500 mm).

Visual inspection of internal structures of tested tubes upon cross cut revealed that the prior art slab urethane foam had a relatively thick stiffened impregnated layer formed by a high reaction urethane mixture which had penetrated into the slab foam backing, and particularly in the region adjacent to the injection nozzle a greater and thicker stiffened layer was formed in comparison to a lesser stiffened layer adjacent to the other end.

In clear distinction therefrom, with the latex foam layer of the invention, only a very thin impregnated layer was formed and was hardly sensed by fingers pressing the foamed tube from the outside throughout the entire length thereof.

As to hardness (Ascar C-type), the prior art slab urethane foam exhibits high values near the injection spout and rapidly lowered values near the other end as seen from Runs 1, 3 and 5. This is due to differences in impregnation along the length of the tube. Contrastingly, the latex foam layer of the invention shows substantially uniform hardness throughout the entire length from the injection point to the other end as seen from Run 2 which means no substantial difference in impregnation.

Figure 5:
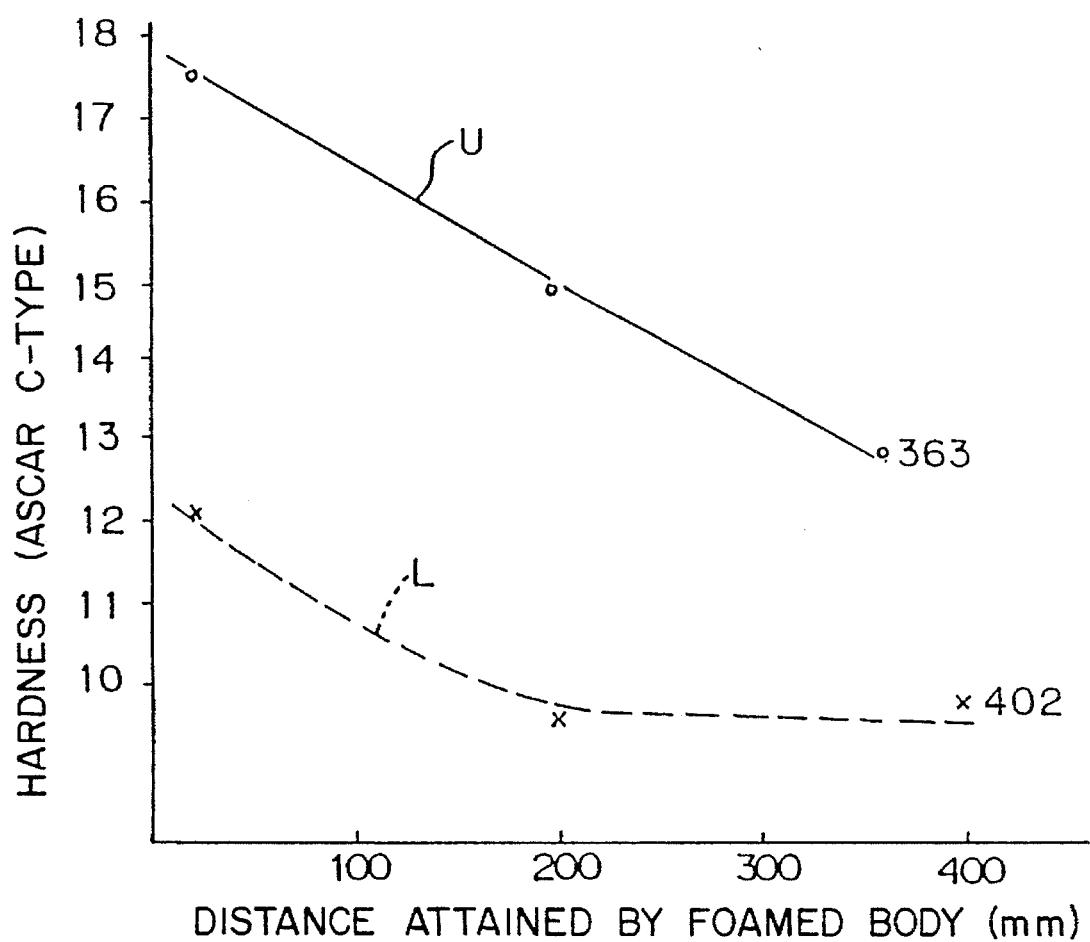
FIG. 5 is a graphic diagram showing differences between the invention L and the conventional art U with respect to distances reached by foaming materials poured into the respective cover materials as a function of hardness.

FIG. 5 depicts test results from Run 3 (the prior art) and Run 4 (the invention) above-listed, the ordinate representing hardness (Ascar C-type) and the abscissa indicating distance actually attained by the body foam. In FIG. 5, the solid line U represents the performance with the slab urethane backing, and broken line L indicates that of the latex foam backing. With the latex foam backing L, the body foam could reach the 402 mm point from the injection point, whereas with slab urethane backing U the body foam stopped at the 363 mm point. With the urethane backing U the body foam shows Ascar C-type hardness of more than 17 about 12 near the injection point and about 10 at middle and terminal points. Further, the prior art cover material with urethane backing is noted to have a generally high level of hardness (more than 14), whereas the cover material of the invention is noted to allow generally lower level of hardness (lower than 14). This is due to the difference in impregnation into the backing by the body foam, with larger impregnation in the prior art and smaller impregnation in the present invention, from which it is realized that, particularly for the foamed article of small diameter or thin thickness the cover material of the invention has a superior ability to permit the body foam to extend a longer distance and to suppress formation of an impregnated stiffened layer.

FIG. 6 also depicts the difference in the ability of these backings, (A) being a diagrammatically enlarged view showing the surface of the latex foam of the invention, (B) being a diagrammatically enlarged view in the same scale of the surface of the slab urethane backing. An outer surface 22 of the latex foam is shown with relatively coarse hatching for clarity purpose and this is the superficial skin previously mentioned in which numerous denser cells 21 are formed. Cells 21 are extremely small, i.e., about 2μ (microns) or at most about 10μ in diameter. Inside the skin 22, denser cells like 21 at the surface are cumulatively formed in the latex foam, and further inside slightly larger open cells 18 are formed with about a 10–30μ diameter which communicate with each other. These cells 18 are shown by denser hatching and mainly by broken lines. In FIG. 6 (A), slightly larger open cells 18 are illustrated as appearing immediately behind minor cells 21, but in fact, as a thin denser cell layer 20 exists between the skin 22 and the zone including open cells 18 as already explained and illustrated in FIG. 2, open cells 18 cannot be seen directly from the skin 22.

In the prior art slab urethane backing, as shown in FIG. 6 (B), open cells C are formed on the surface being 5–10 times as large as those of the latex foam and yet membranes M between cells are conversely thinned. Of course, no skin is formed on the surface.

As already understood, with the slab urethane backing of the prior art, the stock solution for the body foam is very susceptible to enter the cells C as there is little or no "outer surface" by which the stock solution is blocked or slidingly guided. Contrastingly, the latex foam backing of the invention is advantageously provided with relatively thick membranes or walls between minor cells 21 in the skin 22, and cells 21 are extremely small in diameter so that creamy or liquid foamable mixture, if injected directly upon the skin 22, can beneficially be blocked by the skin and substantially prevented from immediately entering the cells 21 thereby staying on the skin a little while, during which the liquid mixture, being high reaction type, proceeds very rapidly into creamy or foaming and expanding state such that it is unlikely to enter the minute cells 21. The foaming mixture, thus resisted by the minute cells, is made to run and spread over the skin surface 22 to extend into furthest points and unexpectedly attain a longer distance than heretofore unexpectedly.

In this manner, impregnated stiffened layers in the latex foam of the invention can hardly be formed by the foaming mixtures, and a highly comfortable, soft and resilient foamed article having no hard spots over the entire surface can be assuredly produced employing the novel cover material of the invention.

Specific formulations of latices which can be used for the composite cover material of the invention are exemplified below.

EXAMPLE 1

Urethane latex

+HL,1 Ingredients? +HC,22 parts by weight+HZ,1/32 ?

| | |
|---|---|
| DICFOAM F-505 EL* (acrilonitrile butadiene copolymer modified urethane) | 100 |
| F-1 * (ammonium stearate)(foaming agent) | 10 |
| CR-5L* (crosslinking agent) | 3 |
| VONDIC NBA-1* (foam regulator) | 1 |
| CMC* (4% solution) (thickener) | 3 |
| VONCOAT 3750* (thickener) | 1 |
| CATALYST PA-20* (catalyst) | 1 | foaming magnification 3 times
*trade name of Dainippon Ink Chemical Industry Co., Ltd.

EXAMPLE 2

Acrylic latex

+HL,1 Ingredients? +HC,22 parts by weight+HZ,1/32 ?

| | |
|---|---|
| VONCOAT 350* | 100 |
| F-1 * (ammonium stearate)(foaming agent) | 10 |
| VONDIC NBA-1* (foam regulator) | 1 |
| CMC* (4% solution) (thickener) | 3 |
| VONCOAT 3750* (thickener) | 3 |
| 25% ammonium solution (stabilizer) | 0.3 |
| CATALYST PA-20* (catalyst) | 1 | foaming magnification 3 times
*trade name of Dainippon Ink Chemical Industry Co., Ltd.

EXAMPLE 3

Methylene butadiene latex

+HL,1 Ingredients? +HC,22 parts by weight+HZ,1/32 ?

| | |
|---|---|
| DICFOAM F-601* (methylene butadiene copolymer) | 100 |
| F-1 * (ammonium stearate)(foaming agent) | 10 |
| CR-5L*(crosslinking agent) | 2 |
| VONDIC NBA-1* (foam regulator) | 1 |
| VONCOAT 3750* (thickener) | 1 |
| CATALYST PA-20* (catalyst) | 1 | foaming magnification 3 times
*trade name of Dainippon Ink Chemical Industry Co., Ltd.

The cover material of the invention is adapted to be used for making various soft and resilient molded articles having good shapability and comfortability, including integrally foamed articles such as the headrest shown in FIG. 4. Other exemplary articles are illustrated in FIG. 7, that is, in addition to headrest 30, seat portion 60, seat back 61 and armrest 62 are typical products made by integrally molding technique using the cover material of the invention. Moreover, the cover material of the invention is well suited to make thin products such as sun visors as is easily understood from a thin and elongate product and its test results already shown and explained in FIG. 4 and FIG. 5.

We claim:

1. A cover material for an integrally foamed article, comprising a gas permeable fabric and a first layer of latex foam having one side thereof bonded to the back surface of said gas permeable fabric, said latex foam having mechanical open cells which are formed in an internal part thereof and communicating with each other from end to end, a second layer of latex foam formed on the other side of said first layer of latex foam, said second layer of latex foam having holes communicating with some of said mechanical open cells and being smaller in size than said mechanical open cells, said second layer of latex foam having a skin layer formed thereon, said skin layer having holes communicating with some of said holes of said second layer of latex foam and presenting a foam barrier surface which serves to guide a foamable mixture to be injected onto said barrier surface as a body foam of said article, such that said first and second layers of latex foam, said skin and said foam body are gas permeable.

2. A cover material as claimed in claim 1 wherein said mechanical open cells formed in said first latex foam layer exist with a density in the range of from 20,000 cells per $cm^2$ to 70,000 cells per $cm^2$.

3. A cover material as claimed in claim 1 wherein said fabric is selected from the group consisting of knitted, woven and non-woven fabrics made of natural fibers selected from the group consisting of cotton and wool, synthetic fibers and mixtures thereof, said fabric having gas permeability.

4. A cover material as claimed in claim 1 wherein said first layer of latex foam is formed from latex material selected from the group consisting of styrene butadiene rubber, acrylonitrile butadiene rubber, natural rubber, silicone rubber and methylene butadiene rubber;, and resinous latices selected from the group consisting of acrylic, urethane, vinyl chloride, vinyl acetate, polyvinyl alcohol, polystyrene and polyethylene, and alloys and copolymers thereof.

5. A cover material as claimed in claim 4 wherein said first layer of latex foam is an acrylic polymer.

6. A cover material as claimed in claim 4 wherein said first layer of latex foam has a thickness in the range of from 0.1 to 3.0 mm.

7. A cover material as claimed in claim 1 wherein said gas permeable fabric is a knitted polyester fabric, said first layer of latex foam is of urethane and said open cells of said first layer of latex foam exist in the number of 30,000–60,000 cells per $cm^2$.

8. A method for manufacturing a cover material having latex foam backing, comprising the steps of:

a) providing a gas permeable fabric selected from the group consisting of knitted, woven and non-woven fabrics made of natural fibers selected from the group consisting of cotton and wool, synthetic fibers, and mixtures thereof, b) stirring a first latex foam material and applying said first latex foam material to one surface of said gas permeable fabric as a coating on the back surface of said gas permeable fabric at a temperature in the range of 20°–40° C. with a uniform thickness such that said first latex foam material, upon completing its foaming and curing, has the thickness of from about 0.1–3.0 mm, said first latex foam material being selected from the group consisting of natural rubber, synthetic rubber and copolymers thereof; and resinous latices including natural and synthetic resins and forms and alloy and copolymers thereof selected from the group consisting of acrylic, urethane, vinyl chloride, vinyl acetate, poly-vinyl alcohol, poly-styrene and polyethylene, and c) drying said first latex foam material on said back of said gas permeable fabric at a temperature in the range of from 80° to 120° C. for the period of 3–5 minutes to form a first latex foam layer, and permitting said first latex foam material to cure at a temperature of 150° C. for 2–3 minutes thereby to cause a second latex foam layer having a permeable skin layer thereon opposite said first latex foam layer to form on the surface of said first latex foam layer and also mechanical open cells to form in the internal part of said first latex foam layer, wherein said second latex foam layer also has internal mechanical open cells and is denser than said first latex foam layer; said first and second latex foam layers and said skin layer being gas permeable; whereby a cover material having a layer of latex foam bonded mechanically to said one surface is manufactured.

9. A method as claimed in claim 8 wherein said first latex material is applied by means of knife-coating technique.

10. A method as claimed in claim 8 wherein said first latex material is applied by means of roll-coating technique.

11. A method as claimed in claim 8 wherein said stirring step b) is carried out for the period of 3–15 minutes while holding said latex material at a temperature in the range of 20°–40° C.

12. A method as claimed in claim 8 wherein, after said drying and subsequent to said curing, said gas permeable fabric applied with said first latex foam layer is subjected to a crushing step thereby to increase the permeability of said first latex foam layer.

13. An integrally foamed article composed of a cover material with a fabric formed from a plurality of fibers, and a layer of latex foam applied directly to the back surface of said fabric, and of a body foam formed from a liquid material poured directly on said latex foam and foamed and cured thereat, wherein portions of said layer of latex foam on the side thereof adjacent to said back surface of said fabric embrace some of the individual said fibers of said fabric; said layer of latex foam having mechanical open cells formed in the internal part thereof such that said layer of latex foam is permeable; said layer of latex foam also having a layer of cells on a side of said layer of latex foam opposite from said fabric and a gas permeable skin layer on a side of said layer of cells opposite from said layer of latex foam, said skin layer being formed with holes and presenting a surface against a foamable liquid mixture for said body foam whereby said skin layer is capable of substantially preventing impregnation or penetration of said mixture and mechanically bonding with said body foam.

14. An integrally foamed article as claimed in claim 13 wherein said article constitutes a seat component.

15. A sun visor formed from the cover material of claim 1.

16. A sun visor comprising a cover material having a latex foam backing manufactured according to the method of claim 8.

* * * * *

UNITED STATES PATENT AND TRADEMARK OFFICE
CERTIFICATE OF CORRECTION

PATENT NO. : 5,460,873
DATED : October 24, 1995
INVENTOR(S) : Taro Ogawa, Fumio Goto, Yasuo Tanaka and Christian Thary It is certified that error appears in the above-identified patent and that said Letters Patent is hereby corrected as shown below:

Column 12, line 47, "rubber;," should read --rubber;--.

Column 13, line 5, "C." should read --C--.

Column 13, line 17, "C." should read --C--.

Column 13, line 19, "C." should read --C--.

Column 14, line 18, "is permeable;" should read --is gas permeable;--.

Signed and Sealed this

Thirtieth Day of June, 1998

Attest:

BRUCE LEHMAN

Attesting Officer

Commissioner of Patents and Trademarks